United States Patent
Luo et al.

(10) Patent No.: US 7,788,497 B2
(45) Date of Patent: Aug. 31, 2010

(54) CREDENTIAL MAPPING OF WEBLOGIC AND DATABASE USER IDS

(75) Inventors: Fei Luo, Bedmister, NJ (US); Rahul Srivastava, Randolph, NJ (US)

(73) Assignee: BEA Systems, Inc., Redwood Shores, CA (US)

( * ) Notice: Subject to any disclaimer, the term of this patent is extended or adjusted under 35 U.S.C. 154(b) by 1027 days.

(21) Appl. No.: 11/108,386

(22) Filed: Apr. 18, 2005

(65) Prior Publication Data

US 2006/0156023 A1 Jul. 13, 2006

Related U.S. Application Data

(60) Provisional application No. 60/643,753, filed on Jan. 13, 2005.

(51) Int. Cl.
- *G06F 21/00* (2006.01)
- *G06F 7/04* (2006.01)
- *G06F 17/30* (2006.01)

(52) U.S. Cl. ............... 713/182; 713/183; 726/4; 726/5; 726/6; 726/7

(58) Field of Classification Search ......... 713/182–183, 713/165–167; 726/4–7
See application file for complete search history.

(56) References Cited

U.S. PATENT DOCUMENTS

| 6,158,010 | A | 12/2000 | Moriconi et al. ............ 713/201 |
| 2003/0229888 | A1* | 12/2003 | Spotswood et al. ......... 717/116 |
| 2004/0064552 | A1* | 4/2004 | Chong et al. ................ 709/224 |
| 2004/0123048 | A1* | 6/2004 | Mullins et al. .............. 711/141 |
| 2006/0031388 | A1* | 2/2006 | Tankov et al. ............... 709/217 |
| 2006/0080435 | A1* | 4/2006 | Tankov et al. ............... 709/225 |

OTHER PUBLICATIONS

Chugn et al., "Java and Security, Part 1"; O'Reilly on Java.com.™; http://www.onjava.com/1pt/a/4757; pp. 1-222; printed Apr. 18, 2005.
Chugn et al., "Java and Security, Part 2"; O'Reilly on Java.com.™; http://www.onjava.com/1pt/a/4757; pp. 1-29; printed Apr. 8, 2005.

* cited by examiner

*Primary Examiner*—Benjamin E Lanier
(74) *Attorney, Agent, or Firm*—Fliesler Meyer LLP

(57) ABSTRACT

A connection pool can use a credential mapper to map credentials for an application server into a credential to use with the database management system. This can allow objects such as an Enterprise Java Bean to access the database with more specific credentials than the anonymous connection pool connection user name/password.

15 Claims, 3 Drawing Sheets

ND DATABASE USER IDS

CREDENTIAL MAPPING OF WEBLOGIC AND DATABASE USER IDS

CLAIM OF PRIORITY

This application claims priority to U.S. Provisional Application No. 60/643,753 entitled "Credential Mapping of WebLogic and Database User Ids" by Fei Luo et al., filed Jan. 13, 2005.

BACKGROUND OF INVENTION

Application servers such as the WebLogic server available from BEA Systems of San Jose, Calif. allow users to do a number of functions. One of the functions that can be allowed by the application servers is to provide access to a database. In one embodiment, a connection pools, such as a Java Database Connectivity (JDBC) connection pools, are provided. Such connection pools allow for a number of objects in the application server to access the database through the connection. The connection pool uses a number of connections that are already set up with the database. When a connection is needed, an object at the application server uses the connection in the connection pool to connect up with the database.

DETAILED DESCRIPTION

Figure 1:
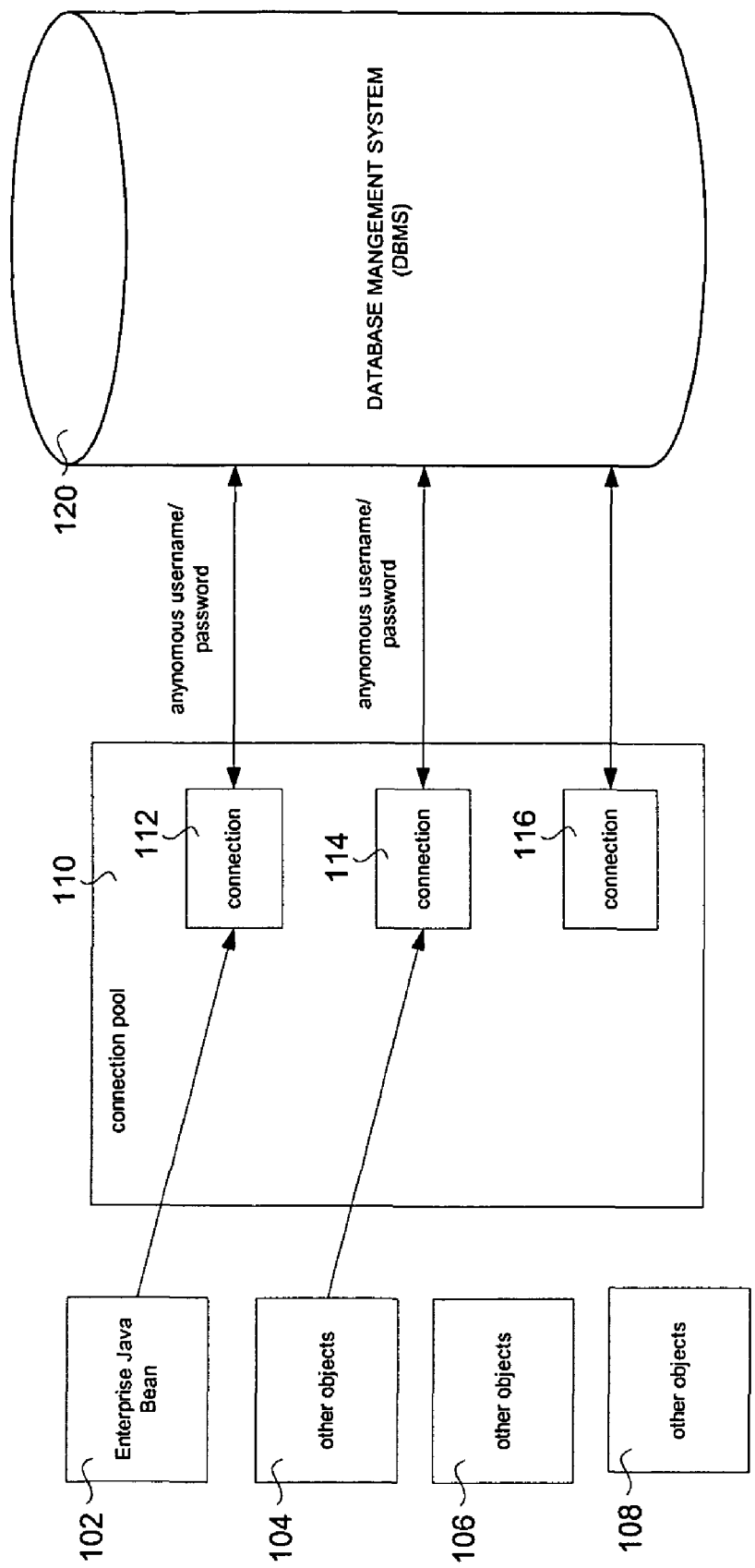
FIG. 1 is a diagram illustrating connecting to a database using a connection pool.

FIG. 1 illustrates an example with objects, such as Enterprise JavaBean (EJB) object 102 and objects 104, 106 and 108. These objects can be part of applications run on an application server. Connection pool 110, such as a JDBC connection pool, can provide connections 112, 114 and 116 for connecting to a database 120. In one embodiment, the connection pool 110 uses a single anonymous user name and password to access the database 120 for each object and application. This means that each application and object operating on the application server has the same level of access into the database 120. In many cases, it is desirable for certain tables, rows and the like in the database 120 to only be accessible to certain users or roles. For example, in many embodiments, there are different roles in a company which result in a different desired levels of data access. For example, in some companies, only managers should be able to modify certain data in the database. One embodiment of the present invention is a way of providing more specified and detailed credential information to the database.

Figure 2:
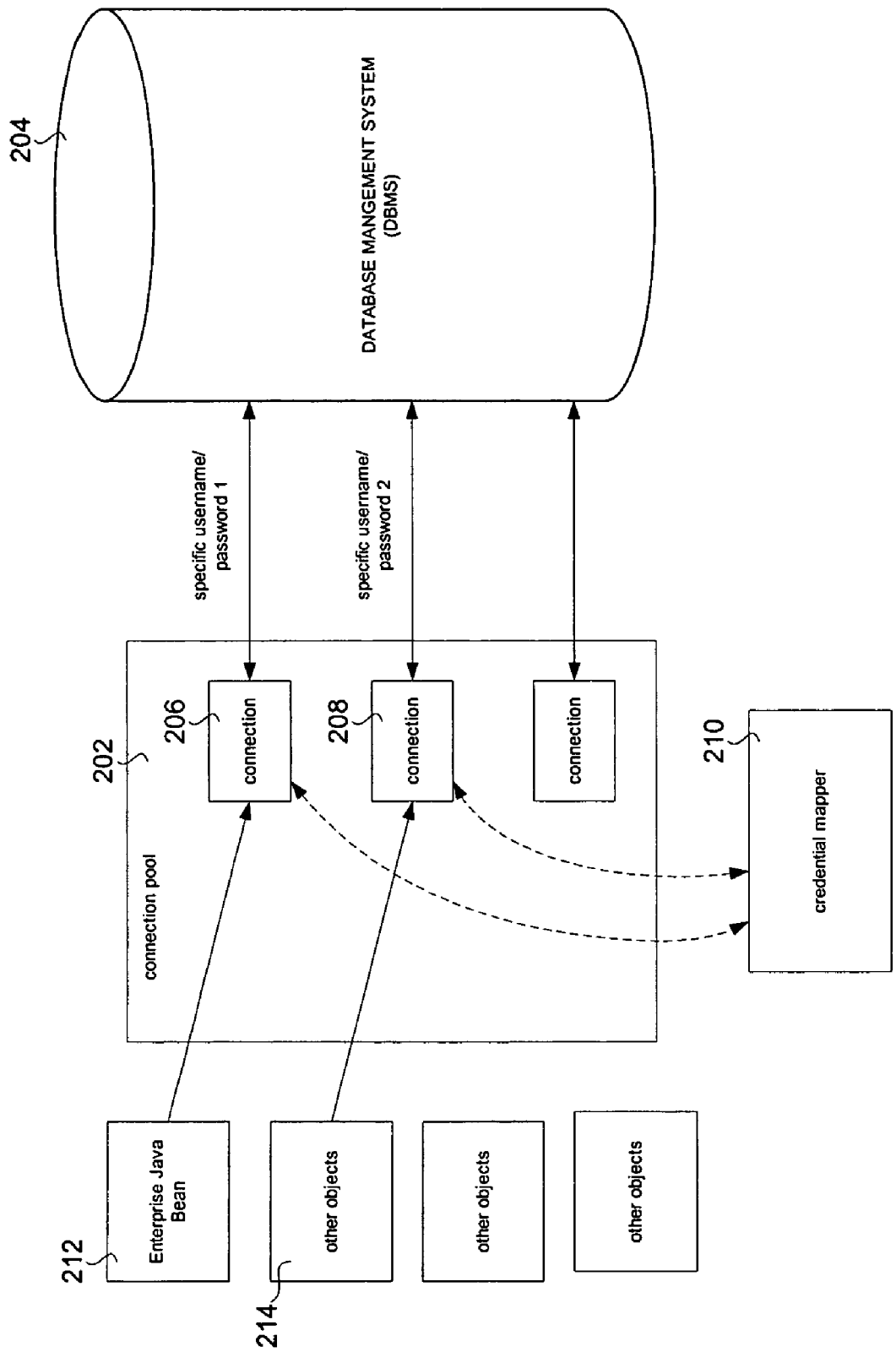
FIG. 2 is a diagram illustrating the use of a credential mapper to have a more specific credentials for a database.

FIG. 2 illustrates an embodiment in which a connection pool 202 is operably connected to database 204. Some connections 206 and 208 using the connection pool to connect to the database use a credential mapper 210. The credential mapper 210 is adapted to map at least one credential for the application server into a credential for the database. For purpose of this application, the word "credential" means any sort of identifying information such as password or other security information. A "credential" is not meant to be limited to any technical meaning of the term credential. The credentials can be user name/password pairs, username alone, conventional credentials, tickets or any other information for identifying a user.

In one embodiment, at least one credential for the database indicates a user to a greater specificity than an anonymous connection pool ID.

Looking at the example of FIG. 2, the Enterprise Java Bean 212 can use connection 206 to connect to the database 204. The connection 206 can use the credential mapper 210 to obtain a specific username and password for the database management system 204. Additionally, the object 214 accessing connection using the connection 208 can obtain a different credential (username and password) from the credential mapper 210 to send to the database manager system 204.

Figure 3:
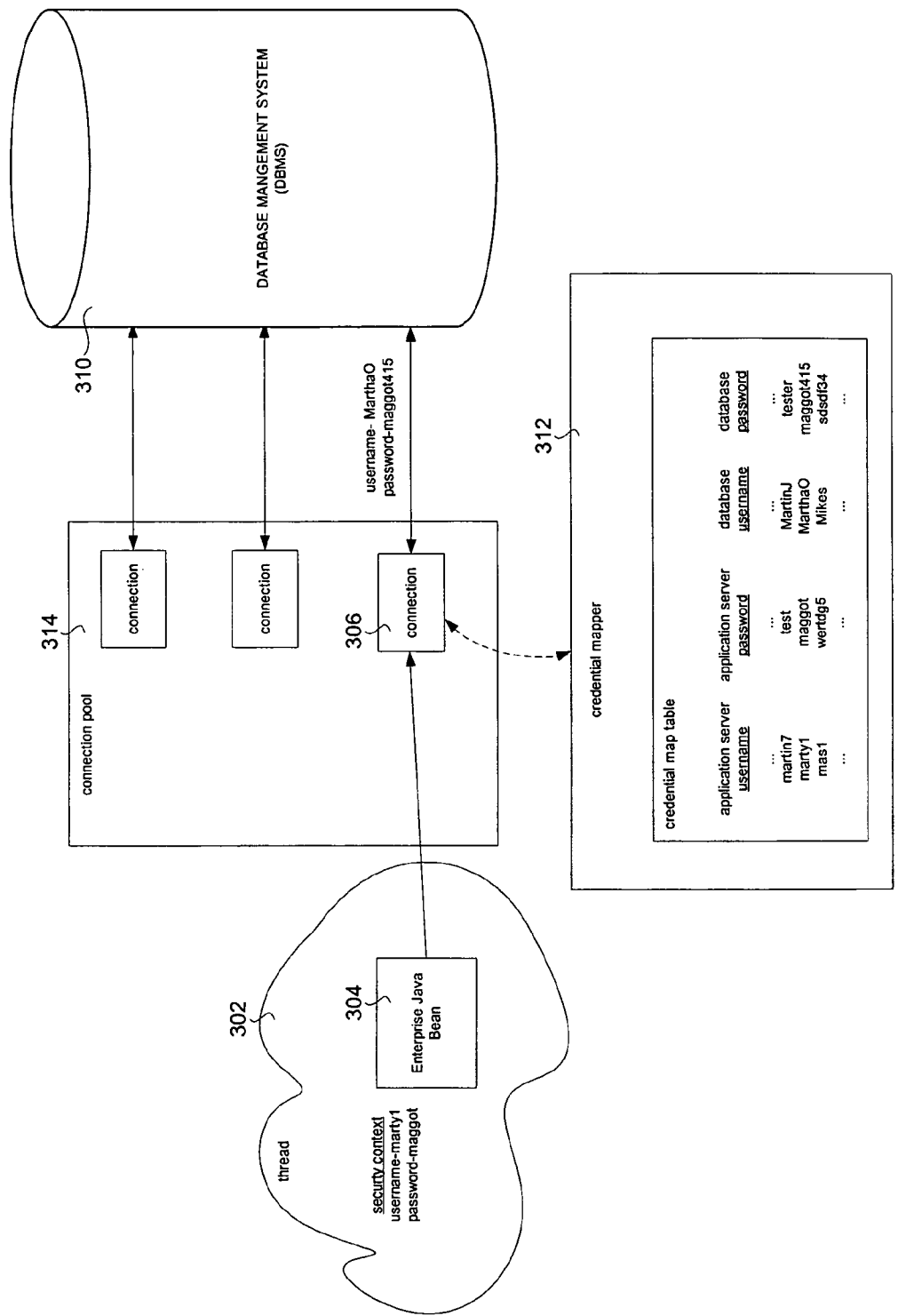
FIG. 3 is a diagram illustrating the details of a simplified exemplary embodiment on one embodiment illustrating the operation of a credential mapper.

FIG. 3 illustrates an example of one embodiment of the present invention. In the example of FIG. 3, the application server has a number of threads, such as the thread 302. In one embodiment, each thread on the application server has its own security context. The security context can store credential information for the user. This security context can be maintained for the thread across different machines running the server software. Examples describing the security systems for server software are described in the U.S. Pat. No. 6,158,010, incorporated herein by reference, U.S. patent application Ser. No. 10/961,595 entitled "Distributed Enterprise Security System" filed Oct. 8, 2004,; U.S. patent application Ser. No. 10/961,549 entitled "Distributed Security system with Dynamic Roles" filed Oct. 8, 2004,; U.S. patent application Ser. No. 10/961,593 entitled "Distributed Security System Policies" filed Oct. 8, 2004,; U.S. patent application Ser. No. 10/961,850 entitled "Dynamically Configurable Distributed Security System" filed Oct. 8, 2004 and U.S. patent application Ser. No. 10/962,108 entitled "Distributed Enterprise Security System" filed Oct. 8, 2004, incorporated herein by reference.

In the example of FIG. 3, the thread 302 has an Enterprise Java Bean 304 which uses a connection 306 to connect to the database 310. In this example, the credential mapper 312 can convert the credential information from the security context of the thread 302 into the credential information for use by the database management system. A simple example uses a credential map table to map the username/password from the thread 302 into a username/password for the database. Details of one implementation of a credential mapper is given in the U.S. Provisional Application No. 60/573,268 entitled "TOKEN HANDLER API" filed May 21, 2004, incorporated herein by reference.

In one embodiment, the application server uses threads which are associated with the security context such as the thread 302. Some of the threads can access the database 310 using at least one credential for the database obtained from the credential mapper 312. The credential mapper is adapted to map at least one credential for the security context of the thread 302 into at least one credential for the database.

The use of the credential mappers 312 for the connection pool 314 can be as an extension of a JDBC implementation.

A number of database manufacturers provide application programming interfaces (APIs) for accessing the database. A disadvantage of these APIs is that certain objects such as EJBs may not know the specific credential information to provide to the APIs. Since threads have their own associated security contexts, the credential mapper can be used without needing to have the ultimate user provide an additional user name and password. For example, the EJB or other object can connect to a database through the connection pool and obtain a specific username/password associated with that user through the credential mapper without ever requiring the thread to independently maintain credential information for the database.

DETAILED DESCRIPTION OF ONE NON-LIMITING EXAMPLE

The following description gives one non-limiting implementation of one embodiment. The discussion below gives one embodiment, but those skilled in the art will understand that other implementations of the above-described concepts can be done. Any potentially limiting language given below is to be interpreted in the context of the specific non-limiting implementation and is not meant to limit the general concepts.

A database-server specific identity (username/password) can be specified in the Pool's definition. Consequently, application clients that borrow and use these connections from the Pool remain anonymous to the database server. The latter is unable to perform user-specific tasks like auditing, access-control, etc.

Database vendors offer proprietary solutions to propagate client credentials over anonymous JDBC connections to solve this problem. These solutions are typically exposed through extensions to the standard JDBC API interfaces.

By virtue of the a dynamic wrapper technology, applications can automatically have access to all vendor-specific extensions to the JDBC API. Thus, applications will be able to cast to the vendor type and invoke these extension APIs.

There exist another class of applications that do not obtain JDBC connections directly from Pools. Middle-tier layers, such as Oracle TopLink, EJB CMP containers, etc, obtain the connections. WLS will be required to internally lookup the corresponding RDBMS-specific identities and invoke the vendor extension APIs in this case.

Existing vendor-specific APIs to set the client identities are not secure. They do not validate the identities being propagated. Hence, using a new CREDENTIAL_MAP would be the more secure method for applications to enable this functionality.

New configuration attribute "CredentialMappingEnabled" can be provided. Applications wanting to enable this feature will set this attribute to true. When this attribute is enabled, the server software can internally invoke the required vendor APIs. Currently, Oracle & DB2 offer such extensions:

```
com.ibm.db2.jcc.DB2Connection.setDB2ClientUser(String user)
oracle.jdbc.OracleConnection.setClientIdentifier(String id)
```

They also can be required to configure the JDBC credential mapper via an administration Console. The JDBC credential mapper can do the mapping between server-& database-specific identities.

In one embodiment, A credential mapper JPI can be as follows:

```
/**
 * @default false
 * @configurable
 * @dynamic
 */
public boolean isCredentialMappingEnabled( );
public void setCredentialMappingEnabled(boolean credentialMappingEnabled);
```

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system including an application server, for use in providing access by a software application to a database, comprising:

a computer including a processor, computer readable medium, and application server operating thereon, wherein the application server allows software applications to be associated with a first credential including a first username and password, for use within the application server;

a connection pool executing within the application server and operably connected to a database, wherein the connection pool provides access by the software applications to the database;

a credential mapper, wherein the credential mapper includes a credential map table that defines a plurality of application server usernames and passwords together with, for each application server username and password pair, a corresponding database username and password, and wherein the credential mapper is adapted to optionally map credentials for use within the application server to credentials for use with the database;

wherein, upon a software application optionally electing credential mapping, when threads accessed by the software application use a connection of the connection pool, including a security context having the first credential, the credential mapper converts the security context of the thread, including mapping the first credential as provided in the security context to a second credential including a second username and password, as defined by the credential map table, for use with the database;

wherein the second username and password is then sent to the database; and wherein software applications can elect to use credential mapping by setting a credential mapping enabled configuration attribute, including wherein when the credential mapping enabled configuration attribute is set for a software application, the credential mapper maps credentials for thread security contexts associated with that software application, and when the credential mapping enabled configuration attribute is not set for the software application, the software application uses the first credential, or a default credential, to access the database.

2. The system of claim 1, wherein the at least one credential for the database indicates a user to a greater specificity than an anonymous connection pool connection.

3. The system of claim 1, wherein some credentials for the database obtained from the credential mapper allow greater access to elements of the database than other credentials for the database obtained from the credential mapper.

4. The system of claim 1, wherein each of the software applications are associated with Enterprise Java Beans (EJB), and the EJBs connect with the connection pool and provide the security context to the threads, including the one or more of a first username password, and the credential mapper converts the one or more of a first username or password in the thread's security context into the one or more of a second username or password, and the application server then communicates the one or more of a second username or password to the database through a vendor specific JDBC API extension.

5. The system of claim 1, wherein each of the threads have their own associated security context, and wherein the application and credential mapper can provide a different mapping for each of a different user or sot are application to access the database, based on the first credential including the one or more of a first username or password that is currently provided in the thread's security context.

6. A method for use in providing access by a software application to a database, comprising the steps of:

providing an application server for operating on a computer including a processor, wherein the application server allows software applications to be associated with a first credential including a first username and password, for use within the application server;

providing a connection pool operably connected to a database, wherein the connection pool provides access by the software applications to the database;

providing a credential mapper, wherein the credential mapper includes a credential map table that defines a plurality of application server usernames and passwords together with, for each application server username and password pair, a corresponding database username and password, and wherein the credential mapper is adapted to optionally map credentials for use within the application server to credentials for use with the database;

wherein, upon a software application optionally electing credential mapping, when threads accessed by the software application use a connection of the connection pool, including a security context having the first credential, the credential mapper converts the security context of the thread, including mapping the first credential as provided in the security context to a second credential including a second username and password, as defined by the credential map table, for use with the database;

wherein the second username and password is then sent to the database; and wherein software applications can elect to use credential mapping by setting a credential mapping enabled configuration attribute, including wherein when the credential mapping enabled configuration attribute is set for a software application, the credential mapper maps Credentials for thread security contexts associated with that software application, and when the credential mapping enabled configuration attribute is not set for the software application, the software application uses the first credential, or a default credential, to access the database.

7. The method of claim 6, wherein the at least one credential for the database indicates a user to a greater specificity than an anonymous connection pool connection.

8. The method of claim 6, wherein some credentials for the database obtained from the credential mapper allow greater access to elements of the database than other credentials for the database obtained from the credential mapper.

9. The method of claim 6, wherein each of the software applications are associated with Enterprise Java Beans (EJB), and the EJBs connect with the connection pool and provide the security context to the threads, including the one or more of a first username or password, and the credential mapper converts the one or more of a first username or password in the thread's security context into the one or more of a second username or password, and the application server then communicates the one or more of a second username or password to the database through a vendor specific JDBC API extension.

10. The method of claim 6 wherein each of the threads have their own associated security context, and wherein the application and credential mapper can provide a different mapping for each of a different user or software application to access the database, based on the first credential including the one or mote of a first username or password that is currently provided in the thread's security context.

11. A computer readable medium, including instructions stored thereon which when read and executed by a computer cause the computer to perform the steps comprising:

providing an application server for operating on a computer including a processor, wherein the application server allows software applications to be associated with a first credential including a first username and password, for use within the application server;

providing a connection pool operably connected to a database, wherein the connection: pool provides access by the software applications to the database;

providing a credential mapper, wherein the credential mapper includes a credential map table that defines a plurality of application server usernames and passwords together with, for each application server username and password pair, a corresponding database username and password, and wherein the credential mapper is adapted to optionally map credentials for use within the application server to credentials for use with the database;

wherein, upon a software application optionally electing credential mapping, when threads accessed by the software application use a connection of the connection pool, including a security context having the first credential, the credential mapper converts the security context of the thread, including mapping the first credential as provided in the security context to a second credential including a second username and password, as defined by the credential map table, for use with the database;

wherein the second username and password is then sent to the database; and wherein software applications can elect to use credential mapping by setting a credential mapping enabled configuration attribute, including wherein when the credential mapping enabled configuration attribute is set for a software application, the credential mapper maps credentials for thread security contexts associated with that software application, and when the credential mapping enabled configuration attribute is not set for the software application, the software application uses the first credential, or a default credential, to access the database.

12. The computer readable medium of claim 11, wherein the at least one credential for the database indicates a user to a greater specificity than an anonymous connection pool connection.

13. The computer readable medium of claim 11, wherein some credentials for the database obtained from the credential mapper allow greater access to elements of the database than other credentials for the database obtained from the credential mapper.

14. The computer readable Medium of claim 11, wherein
each of the software applications are associated with Enterprise Java Beans (EJB), and
the EJBs connect with the connection pool and provide the security context to the threads, including the one or more of a first username or password, and
the credential mapper converts the one or more of a first username or password in the thread's security context into the one or more of a second username or password, and
the application server then communicates the one or more of a second username or password to the database through a vendor specific JDBC API extension.

15. The computer readable medium of claim 11, wherein each of the threads have their own associated security context, and wherein the application and credential mapper can provide a different mapping for each of a different user or software application to access the database, based on the first credential including the one or more of a first username or password that is currently provided in the thread's security context.

* * * * *

UNITED STATES PATENT AND TRADEMARK OFFICE
CERTIFICATE OF CORRECTION

| | | |
|---|---|---|
| PATENT NO. | : 7,788,497 B2 | Page 1 of 1 |
| APPLICATION NO. | : 11/108386 | |
| DATED | : August 31, 2010 | |
| INVENTOR(S) | : Fei Luo et al. | |

It is certified that error appears in the above-identified patent and that said Letters Patent is hereby corrected as shown below:

On sheet 1 of 3, in Figure 1, Box No. 120, line 1, delete "Mangement" and insert -- Management --, therefor.

On sheet 2 of 3, in Figure 2, Box No. 204, line 1, delete "Mangement" and insert -- Management --, therefor.

On sheet 3 of 3, in Figure 3, Box No. 310, line 1, delete "Mangement" and insert -- Management --, therefor.

On sheet 3 of 3, in Figure 3, Box No. 302, line 2, delete "securty" and insert -- security --, therefor.

In column 3, line 27, after "the" delete "a".

In column 5, line 59, in claim 5, delete "sot are" and insert -- software --, therefor.

In column 6, line 30, in claim 6, delete "Credentials" and insert -- credentials --, therefor.

In column 6, line 56, in claim 10, after "claim 6" insert -- , --.

In column 6, line 61, in claim 10, delete "mote" and insert -- more --, therefor.

In column 7, line 5, in claim 11, delete "connection:" and insert -- connection --, therefor.

In column 8, line 12, in claim 14, delete "Medium" and insert -- medium --, therefor.

Signed and Sealed this
Fourteenth Day of August, 2012

David J. Kappos
*Director of the United States Patent and Trademark Office*